(12) United States Patent
Ochs

(10) Patent No.: US 7,263,783 B2
(45) Date of Patent: Sep. 4, 2007

(54) MATERIAL MEASURE WITH PARALLEL TAPE MEASURES

(75) Inventor: Bernhard Ochs, Hirscheid-Seigendorf (DE)

(73) Assignee: Bosch Rexroth Mechatronics GmbH, Schweinfurt (DE)

( * ) Notice: Subject to any disclaimer, the term of this patent is extended or adjusted under 35 U.S.C. 154(b) by 0 days.

(21) Appl. No.: 11/366,635

(22) Filed: Mar. 2, 2006

(65) Prior Publication Data
US 2007/0028477 A1 Feb. 8, 2007

(30) Foreign Application Priority Data
Aug. 3, 2005 (EP) .................................. 05004994

(51) Int. Cl.
*G01B 3/10* (2006.01)
(52) U.S. Cl. ........................................... 33/764; 33/755
(58) Field of Classification Search ................ 33/755, 33/757, 760, 764, 771, 485, 493
See application file for complete search history.

(56) References Cited

U.S. PATENT DOCUMENTS

| 2,354,756 | A | * | 8/1944 | Henzel et al. ................. 33/755 |
| 3,136,067 | A | * | 6/1964 | Horner .......................... 33/771 |
| 5,138,560 | A | | 8/1992 | Lanfer et al. |
| 6,226,885 | B1 | * | 5/2001 | Korich .......................... 33/760 |
| 2002/0029489 | A1 | * | 3/2002 | Murray .......................... 33/755 |
| 2007/0074417 | A1 | * | 4/2007 | Sun ................................ 33/755 |

FOREIGN PATENT DOCUMENTS

| DE | 3503779 A1 | * | 8/1986 |
| DE | 39 10 873 | | 10/1990 |
| DE | 199 22 363 | | 11/2000 |
| EP | 0 624 780 | | 11/1994 |
| JP | 2003166853 | | 6/2003 |

* cited by examiner

*Primary Examiner*—G. Bradley Bennett
(74) *Attorney, Agent, or Firm*—Michael J. Striker

(57) ABSTRACT

A material measure for a distance measuring system has a base body, a first tape measure with the center line and perforations and secured to the base body, at least one further tape measure substantially identical to the first tape measure and located parallel to the first tape measure, wherein the perforations of the tape measures are located congruently one above the other.

19 Claims, 3 Drawing Sheets

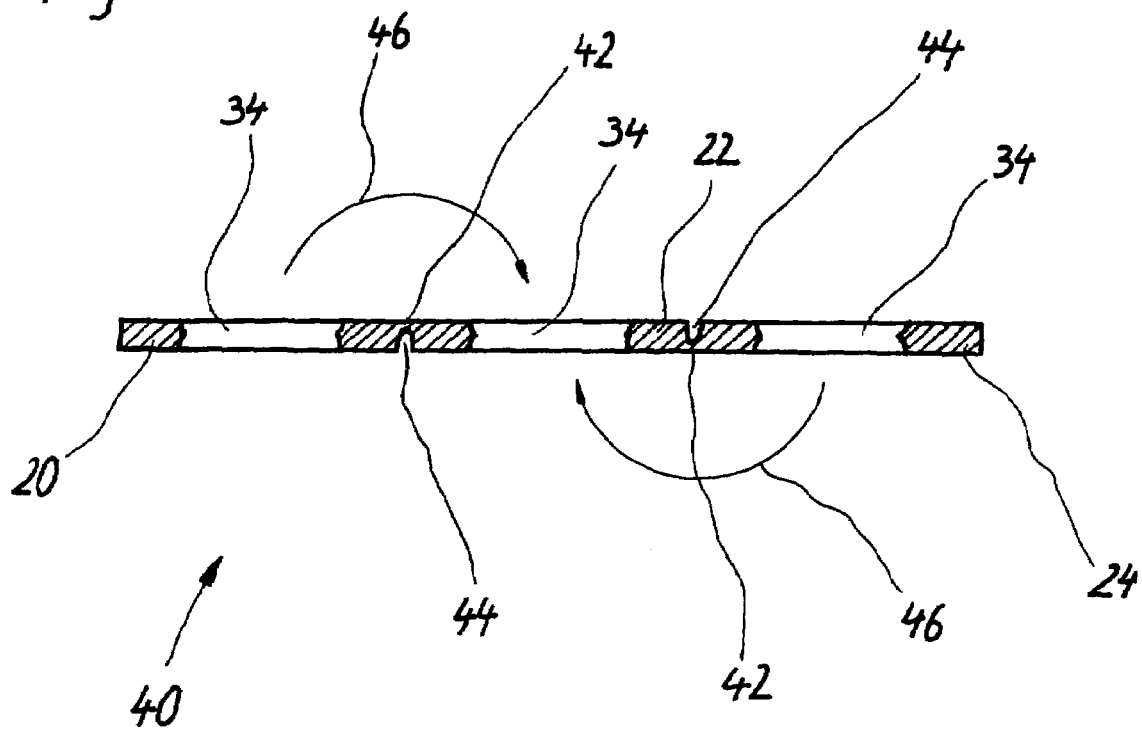

MATERIAL MEASURE WITH PARALLEL TAPE MEASURES

BACKGROUND OF THE INVENTION

The invention relates to a material measure for a distance measuring system.

Such material measures are known from German Patent Disclosure DE 199 22 363, which is hereby incorporated in full as a reference. It shows a material measure which has a base body 3, to which a first tape measure 29 with perforations 37 is secured.

The base body 3 is formed by the guide rail of a linear anti-friction guideway. The center line, not shown, of the tape measure is therefore a straight line. On the guide carriage 19 of this linear anti-friction guideway, there is a sensor head 31, with which the tape measure can be scanned inductively to ascertain distance information. As perforations, rectangles are provided, which extend transversely to the center line of the tape measure and are located periodically. The tape measure is of steel and has a thickness of approximately 0.3 mm. The width of the rectangle and the spacing in the longitudinal direction is 0.5 mm each, so that the inductive sensor head outputs sine and cosine signals with a period of 1 mm. The period of the tape measure is set exactly by means of a suitable tensing or stretching thereof. The stretched tape measure is secured to the base body by means of spot welds, and it is received in an indentation which is closed with a covering tape 15.

The perforations in the tape measure are made by means of etching. To that end, a flat, unperforated steel band is coated with photoresist and exposed to light with high precision using the desired perforation pattern. The photoresist is then developed and at the places where the perforations are provided it is removed, while it still covers the steel band at the other places. This process is performed on both sides of the tape measure. By dipping the pretreated band into an etching fluid, the perforations are chemically dissolved out of the band. The problem here is that the boundary faces of the perforations, which extend in the thickness direction of the tape measure, have an irregular shape. These irregularities depend on both the process conditions in etching, such as the etching time, and on the geometry of the tape measure as well as its period and thickness. In inductive scanning of the tape measure, these irregularities lessen the precision of the entire distance measuring system.

This leads to conflicting goals, since the thickness of the tape measure should be as great as possible on the one hand, so that as strong a sensor signal as possible can be generated, and as small as possible on the other, so that the least possible irregularity of the perforations will be obtained. Similarly conflicting goals exist in terms of the period of the tape measure. If the period is short, the sensor can generate a more-precise measurement signal, while the irregularity of the perforations of the tape measure increases.

SUMMARY OF THE INVENTION

It is the object of the invention to create a material measure whose tape measure is as precise as possible and at the same time is as thick as possible.

This object is attained by providing that at least one further tape measure, substantially identical to the first tape measure, is provided, which is located parallel to the first tape measure, and the perforations of all the tape measures are located congruently one above the other. The two tape measures thus act like a single tape measure. This effective tape measure is as thick as all the tape measures put together, but at the same time is as precise as a single tape measure.

The material measure of the invention can be produced by gluing the tape measures onto one another in the tensionless state. However, that is difficult, since the tape measures, because of their slight thickness of preferably 0.1 mm, are very flexible, and the period of two different tape measures is never exactly the same. It is therefore proposed that the parallel tape measures are folded from a one-piece rough tape measure. For that purpose, the one-piece rough tape measure has a plurality of fold-symmetrical rows of perforations, that are separated from one another by fold lines. By means of the fold line, which may for instance be embodied as a narrow, straight groove, the site of the fold is precisely predetermined. The fold-symmetrical perforations, which are located side by side on the rough tape measure, will therefore always be located precisely one above the other, even if the period of the rough tape measure fluctuates somewhat in the longitudinal direction.

The fold line may be embodied such that upon folding, the rough tape measure breaks apart into a plurality of separate tape measures. However, it is also conceivable to embody the fold line such that it acts like a film hinge. A tape measure folded in this way can then be further processed like a solid tape measure. What is decisive in each case, however, is that the individual tape measures are not bent in the region of the fold line upon being folded. Such deformations would adversely affect the parallelism of the individual tape measures and thus impair the precision of the overall measuring device.

In a further embodiment, the tape measures can each be tensed in such a way that the perforations are congruent. A material measure of this kind can be produced as follows:

The first tape measure is secured under tension on the base body, as is known from DE 199 22 363, in such a way that it has the desired period. To that end, it is secured to one end of the base body by means of spot welding. Next, the tape measure is stretched, until it has the desired period. To that end, in the tensionless state the tape measure period must be somewhat shorter than the target period. The tensed tape measure is then likewise spot-welded to the diametrically opposed end of the base body.

The second tape measure is now secured, again to one end of the material measure, by means of spot welding. It is advantageous here if the spot weld of the first tape measure is somewhat closer to the end of the base body than the spot weld of the second tape measure. The second spot weld will then fix the two tape measures jointly on the base body, since they rest on one another. Before that, however, the recesses of the two tape measures must be aligned with one another. This is advantageously done with the aid of a microscope, since a very high alignment precision is the goal. As a reference point for the alignment, one recess on each of the two tape measures is used, which is located as close as possible to the second spot weld, and specifically on the side of the spot weld that is tensed in the finished state of the material measure.

Following that, the second tape measure is tensed, until all the perforations are precisely congruent. In this method step as well, a microscope will surely also be used, in order to align two recesses of the two tape measures, which are located on the diametrically opposed, not yet secured end of the second tape measure, with one another. Because of the high precision of the etched tape measures, all the other perforations in the middle region of the material measures are then exactly aligned as well.

Finally, the second end of the second tape measure is also secured with a spot weld. This weld will again be made at a place where both tape measures can be welded jointly to the base body. It is assured in this way that even the tiniest deformations that are made in the tape measures by the spot welds will have the same effect in both tape measures, so that the perforations continue to be exactly congruent. Although this arrangement of the spot welds relative to one another promises advantages, nevertheless any other arrangement may be provided instead, as long as it enables secure fastening of the tape measures.

Depending on the application, still other material measures can be mounted on the base body in this manner. The optimal number can be determined by means of a computer simulation or by trial and error. In material measures for inductive measuring systems, it is advantageous if an electrical contact exists between the tape measures resting on one another, so that the eddy currents that occur in the scanning can propagate unhindered throughout the entire stack of tape measures. This goal can be most simply achieved by providing that cleaned, bright steel tape measures are placed directly on one another and then tensed.

At this point, it should also be noted that the method for cutting a shorter material measure apart from a long material measure in accordance with claim 11 and following claims in DE 199 22 383 A1 can also be performed in a material measure of the invention. However, in a material measure of the invention, the plurality of tape measures are spot-welded jointly.

It should also be noted that the invention does not relate only to tape measures with a straight center line. Instead, it can also be imagined that the tape measure be wound onto a cylinder, so that angle information can be obtained by way of the distance measurement in the circumferential direction. However, a circularly curved tape measure can also be applied to a flat surface, to attain this same function. The perforations of the tape measures can be either periodic or aperiodic. Aperiodic perforations are used for instance in distance measuring systems that function in absolute fashion that use a random sequence of numbers, as described in German Patent Disclosure DE 39 10 873 A1.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a sectional view of a one-piece rough tape measure for use in a material measure according to the invention.

DESCRIPTION OF THE PREFERRED EMBODIMENTS

Figure 1:
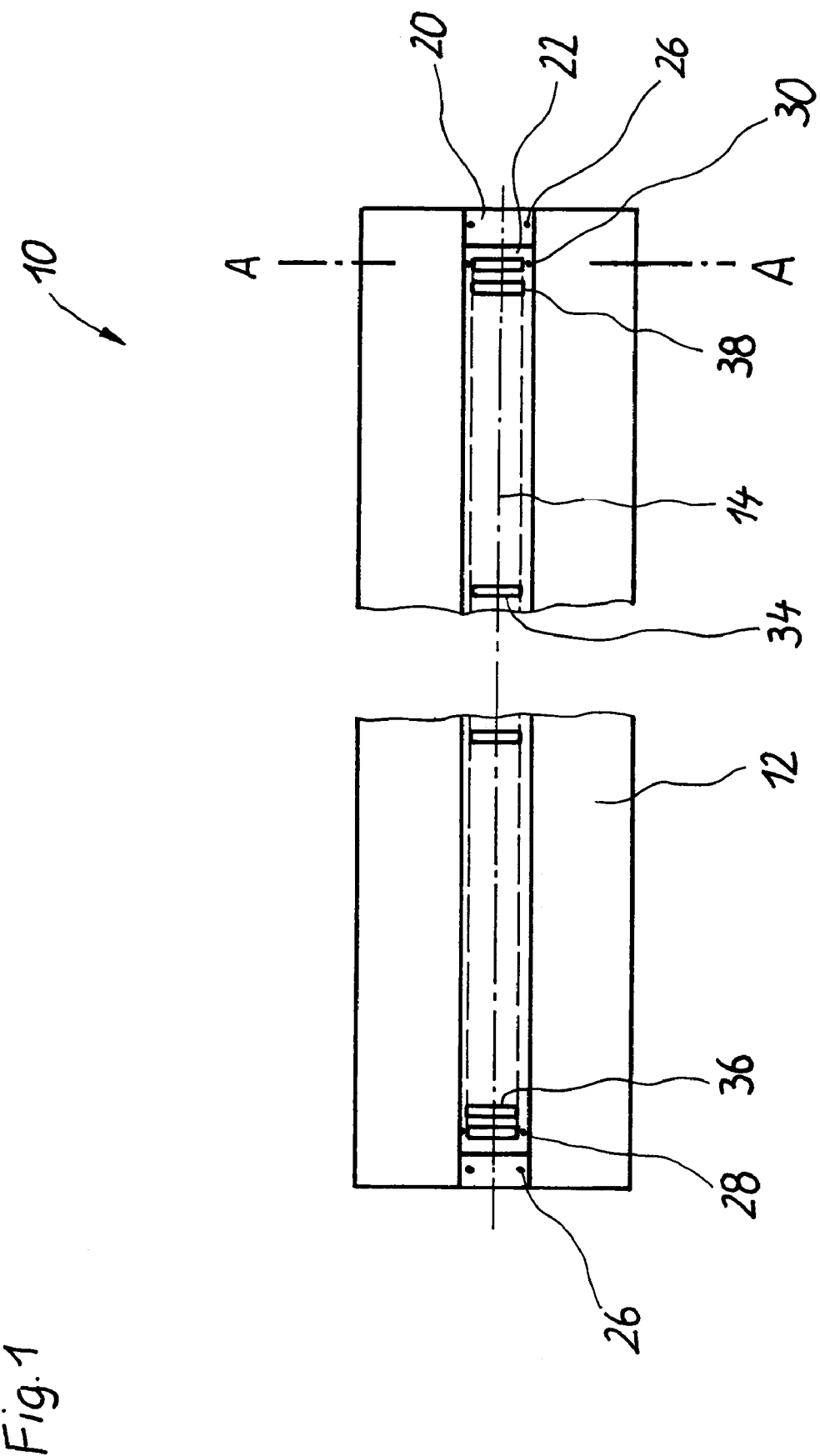
FIG. 1 is a schematic view of a material measure according to the invention.
Figure 2:
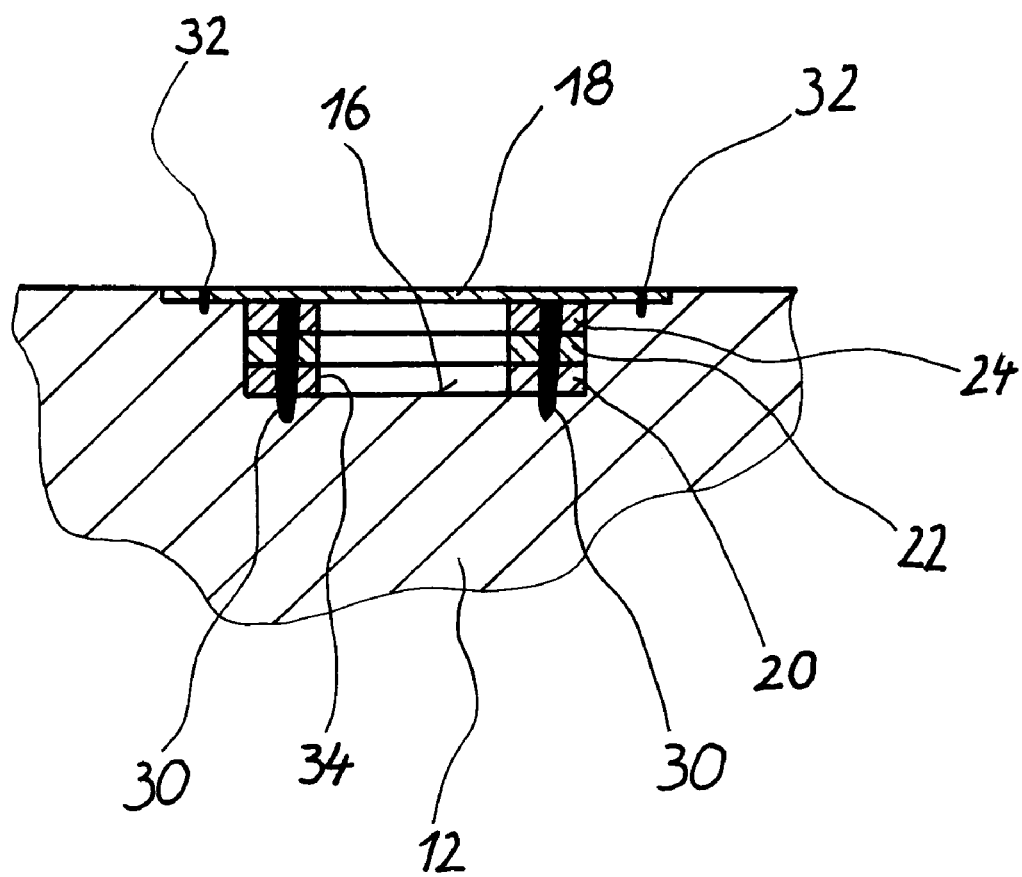
FIG. 2 is a fragmentary sectional view of the material measure of FIG. 1 taken along the line A-A.

In FIG. 1, a material measure of the invention is identified overall by reference numeral 10. It comprises a base body 12, on the outside of which an indentation 16, shown in FIG. 2, is made. The indentation is closed by a covering tape 18, which is joined to the base body by means of two laser-welded seams 32. In FIG. 1, for the sake of simplicity, the covering tape has not been shown. The base body 12 is a straight, elongated profiled body, for instance the guide rail of a linear anti-friction guideway.

Located beneath the covering tape is a first tape measure 20, a second tape measure 22, and a third tape measure 24, each with a straight center line 14. The tape measures are all embodied identically, except in length, and comprise sheet spring steel that is 0.1 mm thick. By means of an etching process, perforations 34 have been made in the tape measures, in the form of rectangular recesses that extend transversely to the longitudinal direction of the tape measure. The recesses are each 0.5 mm wide and are distributed periodically along the center line 14 of the tape measure; in the tensionless state, the minimal period is less than 1 mm. The three tape measures 20, 22, 24 rest directly on one another, so that eddy currents that occur upon an inductive distance measurement can propagate unhindered through the stack of tape measures. The perforations 34 of the tape measures 20, 22, 24 stacked one above the other are located precisely congruently one above the other.

The first tape measure 20 is secured to the base body 12 under tension by four first spot weld connections 26 in such a way that the period of the perforations is exactly 1 mm. The second tape measure 22 has first been secured to the base body by two second spot weld connections 28. Before that, on the basis of a first alignment perforation 36, which is located directly next to the second spot weld connection 28, it was aligned relative to the first tape measure 20, with the aid of a microscope. The second spot weld connection 28 penetrates both tape measures 20, 22, so that they are secured jointly to the base body.

Before the two second spot weld connections 30 are applied, the second tape measure 22 was tensed, such that now the second alignment perforations 38 of the two tape measures are also located exactly one above the other. The second alignment perforations 38 are located directly next to the third spot weld connections 30, just like the first alignment perforations 36 in the tensed region of the tape measures.

Showing the third tape measure 24 has been dispensed with in FIG. 1. The installation of this tape measure proceeds analogously to the second tape measure 22, and the corresponding additional spot weld connections are again offset somewhat from the center of the material measure, because it is disadvantageous to place a plurality of welded points at the same location.

In FIG. 3, a one-piece rough tape measure 40 is shown, from which the parallel tape measures 20, 22, 24 can be folded. For that purpose, the rough tape measure 40 has two fold lines 42, which are embodied as straight grooves 44. The grooves 44 are placed on diametrically opposite sides of the rough tape measure 40, so that the latter can be folded up in accordion fashion, specifically in the direction of the arrows 46 indicating folding. The rough tape measure 40 of spring steel will typically break apart, so that the individual tape measures can be installed as described above.

The grooves 44 are produced together with the perforations 40 in an etching process, so that the perforations 40 are located exactly fold-symmetrically to the fold lines. So that a groove will be created in the etching, the rough tape measure 40 must be covered entirely with photoresist on one side, while on the other side an opening in the photoresist is provided, whose width corresponds to the groove width. The depth of the groove can be adjusted by way of the duration of etching. The U-shaped cross section of the groove is essentially predetermined by the etching process.

It will be understood that each of the elements described above, or two or more together, may also find a useful application in other types of constructions differing from the types described above.

While the invention has been illustrated and described as embodied in a material measure with parallel tape measures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A material measure for a distance measuring system, comprising a base body; a first tape measure with a center line and perforations and secured to said base body; at least one further tape measure substantially identical to said first tape measure and located parallel to said first tape measure, said perforations of said tape measures being located congruently one above the other.

2. A material as defined in claim 1, wherein said perforations of said tape measures are configured as etched perforations.

3. A material as defined in claim 1, wherein said tape measures are each tensed such that said perforations are congruent.

4. A material as defined in claim 1, wherein said tape measures are electrically conductively connected with one another.

5. A material as defined in claim 1, wherein said tape measures rest directly on one another.

6. A material as defined in claim 1; and further comprising means for securing of said tape measures jointly to said base body, said securing means including at least one spot well connection.

7. A material as defined in claim 1, wherein said perforations are configured as rectangular cutouts which extend transversely to said center line of said tape measures and are located periodically.

8. A material as defined in claim 1, wherein said base body is provided with an indentation, said tape measures being located in said indentation; and further comprising a covering tape which closes said indentation of said base body.

9. A material as defined in claim 1, wherein said tape measures have a thickness substantially corresponding to 0.1 mm and are composed of spring steel.

10. A material as defined in claim 1, wherein said base body is configured as a guide rail of a linear anti-friction guideway, and said center line of said tape measures is straight.

11. A material as defined in claim 1, wherein said tape measures are configured as parallel tape measures that are folded from a one-piece rough tape measure.

12. A material as defined in claim 11, wherein at least one fold line is provided on a rough tape measure, and said perforations are located fold-symmetrically to said at least one fold line.

13. A material as defined in claim 12, wherein said at least one fold line is configured as at least one straight groove.

14. A material as defined in claim 12, wherein said at least one fold line is configured so that said tape measure which is a rough tape measure breaks apart on being folded at said at least one fold line.

15. A material as defined in claim 12, wherein said at least one fold line is configured so that it acts as a film hinge.

16. A material as defined in claim 12, wherein at least two said fold lines are provided, each configured as a straight groove, and adjacent ones of said grooves are located on diametrically opposite sides of said tape measure configured as a rough tape measure.

17. A method for producing a material measure for a distance measuring system, comprising the steps of providing a base body; securing a first tape measure with a center line and perforation to the base body; and providing at least one further tape measure, which is substantially identical to said first tape measure and located parallel to said first tape measure, so that said perforations of said tape measures are located congruently one above the other.

18. A method as defined in claim 17, wherein said securing includes securing the first tape measure to one end of said base body; further comprising tensing said first tape measure, so that its perforations have a predetermined spacing; securing the first tape measure to a diametrically opposed end of the base body; securing a further tape measure to one end of the base body, so that the perforations of said material measures on this end are located congruently one above the other; tensing the further tape measure so that all said perforations of said material measures are located congruently one above the other; and securing the further tape measure to a diametrically opposed end of said base body.

19. A method as defined in claim 18; and further comprising aligning the perforations of said tape measures with an aid of a microscope.

* * * * *